(12) United States Patent
Dai et al.

(10) Patent No.: US 11,841,581 B2
(45) Date of Patent: Dec. 12, 2023

(54) REFLECTIVE SHEET AND MANUFACTURING METHOD THEREOF, BACKLIGHT MODULE, AND DISPLAY DEVICE

(71) Applicants: K-Tronics (Suzhou) Technology Co., Ltd., Jiangsu (CN); BOE Technology Group Co., Ltd., Beijing (CN)

(72) Inventors: Hailong Dai, Beijing (CN); Cheng Ma, Beijing (CN)

(73) Assignees: K-Tronics (Suzhou) Technology Co., Ltd., Jiangsu (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/511,451

(22) Filed: Oct. 26, 2021

(65) Prior Publication Data

US 2022/0221760 A1      Jul. 14, 2022

(30) Foreign Application Priority Data

Jan. 13, 2021  (CN) .......................... 202110042179.7

(51) Int. Cl.
*G02F 1/13357*   (2006.01)
(52) U.S. Cl.
CPC .. *G02F 1/133605* (2013.01); *G02F 1/133603* (2013.01); *G02F 1/133606* (2013.01)
(58) Field of Classification Search
CPC ......... G02F 1/133603; G02F 1/133605; G02F 1/133606; G02F 1/133611
See application file for complete search history.

(56) References Cited

U.S. PATENT DOCUMENTS

| | | | | |
|---|---|---|---|---|
| 6,607,286 B2* | 8/2003 | West | .................. | G02B 3/08 362/255 |
| 2005/0276066 A1* | 12/2005 | Kim | ................. | G02F 1/133603 362/561 |
| 2007/0002565 A1* | 1/2007 | Han | ................. | G02F 1/133603 362/240 |
| 2013/0010230 A1* | 1/2013 | Matsuki | ............. | G02B 19/0066 362/97.3 |
| 2015/0146436 A1* | 5/2015 | Heo | ........................ | F21V 7/09 362/346 |
| 2017/0212385 A1* | 7/2017 | Kim | ................. | G02F 1/133608 |
| 2020/0133050 A1* | 4/2020 | Dai | ................... | G02F 1/133504 |
| 2020/0133071 A1* | 4/2020 | Dai | ................... | G02F 1/133605 |

FOREIGN PATENT DOCUMENTS

| | | |
|---|---|---|
| CN | 101644853 A | 2/2010 |
| CN | 105278163 A | 1/2016 |
| CN | 206990981 U | 2/2018 |

(Continued)

*Primary Examiner* — Jia X Pan
(74) *Attorney, Agent, or Firm* — IPro, PLLC

(57) ABSTRACT

A reflective sheet and a manufacturing method thereof, a backlight module, and a display device are provided, the reflective sheet includes: a partition structure provided on a side surface of the reflective sheet, where the reflective sheet includes partition structures arranged on a side surface of the reflective sheet, the partition structures bend the side surface of the reflective sheet at a preset slope, and the partition structures include a plurality of dotted lines arranged horizontally or vertically in parallel.

19 Claims, 2 Drawing Sheets

(56) References Cited

FOREIGN PATENT DOCUMENTS

| | | | | | |
|---|---|---|---|---|---|
| CN | 109164639 | A | * | 1/2019 | ............ G02F 1/1336 |
| CN | 208780959 | U | * | 4/2019 | ....... G02F 1/133605 |
| CN | 208834051 | U | * | 5/2019 | |
| CN | 208834051 | U | | 5/2019 | |
| CN | 210222440 | U | | 3/2020 | |
| JP | 2002182579 | A | | 6/2002 | |

\* cited by examiner

REFLECTIVE SHEET AND MANUFACTURING METHOD THEREOF, BACKLIGHT MODULE, AND DISPLAY DEVICE

CROSS-REFERENCE TO RELATED APPLICATIONS

This application claims priority to Chinese Patent Application No. 202110042179.7 filed in China on Jan. 13, 2021, the entire contents of which are hereby incorporated by reference.

TECHNICAL FIELD

The present disclosure relates to the technical field of display, and particularly relates to a reflective sheet and a manufacturing method thereof, a backlight module, and a display device.

BACKGROUND

With the development of display technology, a liquid crystal display has become the most common display device. The liquid crystal itself does not emit light, and it displays graphics or characters as a result of its modulation of light. The liquid crystal display includes a backlight module, where the backlight module is a light source located behind the liquid crystal, and the luminous effect thereof will directly affect the visual effect of a liquid crystal display module. In the related art, a reflective sheet is used in the backlight module, and the reflective sheet is generally rectangular, and the edges and corners of the reflective sheet are folded; however, since the corners of the reflective sheet are located at the intersection of two edges, the slope (or curvature) of the corners of the reflective sheet is often lower than the slope (or curvature) of the edges of the reflective sheet, so that the corners reflect less light, resulting in a problem that a dark belt or a bright edge appears when the liquid crystal display works, thereby affecting a display effect.

SUMMARY

In view of the above, the present disclosure provides a reflective sheet and a manufacturing method thereof, a backlight module, and a display device, which solves the problem that a dark belt or a bright edge appears during display due to less light reflected by a side corner region of the reflective sheet.

The present disclosure provides the reflective sheet which includes:

partition structures, arranged on a side surface of the reflective sheet, where the partition structures bend the side surface of the reflective sheet at a preset slope;

the partition structures include a plurality of dotted lines arranged horizontally or vertically in parallel.

Optionally, the dotted lines have dotted-to-solid ratios greater than or equal to 1.

Optionally, the slope of the side surface of the reflective sheet increases from the bottom.

Optionally, the reflective sheet satisfies the following formulas:

$$\Sigma_1^n \alpha_i < 90°, \quad 5° \leq \alpha_i \leq 45°;$$

$$5 \text{ mm} < H1 < H2 < \ldots < Hn;$$

where $\alpha_i$ is an included angle between adjacent folding edges of a side surface of the reflective sheet, where $i=1, 2, \ldots, n$; $H_1, H_2, \ldots, H_n$ are the vertical heights between each partition structure and the bottom of the reflective sheet, respectively; N is the number of partition structures.

Optionally, the bottom of the reflective sheet is provided with a lamp hole.

The present disclosure also provides a method for manufacturing the reflective sheet, which includes: manufacturing partition structures on a side surface of the reflective sheet, where the partition structures bend the side surface of the reflective sheet at a preset slope;

the partition structures include the plurality of dotted lines arranged horizontally or vertically in parallel.

Optionally, the slope of the side surface of the reflective sheet gradually increases from the bottom.

Optionally, the dotted lines have the dotted-to-solid ratios greater than or equal to 1.

Optionally, the reflective sheet satisfies the following formulas:

$$\Sigma_1^n \alpha_i < 90°, \quad 5° \leq \alpha_i \leq 45°;$$

$$5 \text{ mm} < H1 < H2 < \ldots < Hn;$$

$\alpha_i$ is an included angle between adjacent folding angles of a side surface of the reflective sheet, where $i=1, 2, \ldots, n$; $H_1, H_2, \ldots, H_n$ are the vertical heights between each partition structure and the bottom of the reflective sheet, respectively; N is the number of partition structures.

Optionally, the bottom of the reflective sheet is provided with a lamp hole.

The present disclosure also provides the backlight module which includes: a back plate, a reflective sheet, a light-emitting element, a diffusion plate, and a functional film which are arranged in a stack in order, where the reflective sheet includes partition structures provided on a side surface of the reflective sheet, and the partition structures bend the side surface of the reflective sheet at a preset slope;

the partition structures include the plurality of dotted lines arranged horizontally or vertically in parallel; and where the reflective sheet constitutes a bottom face and a side surface of a light mixing cavity of the backlight module.

Optionally, the bottom of the reflective sheet is provided with a lamp hole, and the light-emitting element includes an LED lamp strip, where the lamp beads of the LED lamp strip are arranged in the lamp hole.

Optionally, the functional film includes at least one of a light intensifying film, a diffusion film, a quantum dot film, and a blue light preventing film.

Optionally, the light transmittance of the diffusion plate is between 30% to 70%.

Optionally, the dotted lines have the dotted-to-solid ratios greater than or equal to 1.

Optionally, the slope of the reflective sheet side surface increases from the bottom.

Optionally, the reflective sheet satisfies the following formulas:

$$\Sigma_1^n \alpha_i < 90°, \quad 5° \leq \alpha_i \leq 45°;$$

$$5 \text{ mm} < H1 < H2 < \ldots < Hn;$$

where $\alpha_i$ is an included angle between adjacent folding angles of a side surface of the reflective sheet, where i=1, 2, . . . , n; $H_1, H_2, \ldots, H_n$ are the vertical heights between each partition structure and the bottom of the reflective sheet, respectively; N is the number of partition structures.

Optionally, the bottom of the reflective sheet is provided with a lamp hole.

The present disclosure also provides a liquid crystal display device, which includes the backlight module as claimed in any one of the above-mentioned above and a liquid crystal panel arranged on the light-emitting surface side of the backlight module.

The embodiment of the present disclosure provides the reflective sheet and the manufacturing method thereof, the backlight module, and a display device, where the reflective sheet includes partition structures arranged on a side surface of the reflective sheet, and the partition structures bend the side surface of the reflective sheet at a preset slope; and the partition structures include the plurality of dotted lines arranged horizontally or vertically in parallel. According to the present disclosure, the partition structures are arranged on the side surface of the reflective sheet, which bends the side surface of the reflective sheet, so that light can be uniformly irradiated on the side surface of the reflective sheet, the phenomena that the side surface of the reflective sheet where the light cannot be irradiated or only less light can be irradiated can be prevented, and the light can be effectively diffused, which solves the problem that a dark belt or a bright edge appear during display due to less light reflected by a side corner region of the reflective sheet and improves display effect.

DETAILED DESCRIPTION

The technical solution of embodiments of the present disclosure will now be described more fully hereinafter with reference to the accompanying drawings, in which some, but not all embodiments of the disclosure are shown. Based on the embodiments of the present disclosure, all other embodiments obtained by a person of ordinary skill in the art without inventive effort fall within the scope of protection of this disclosure.

Figure 1:
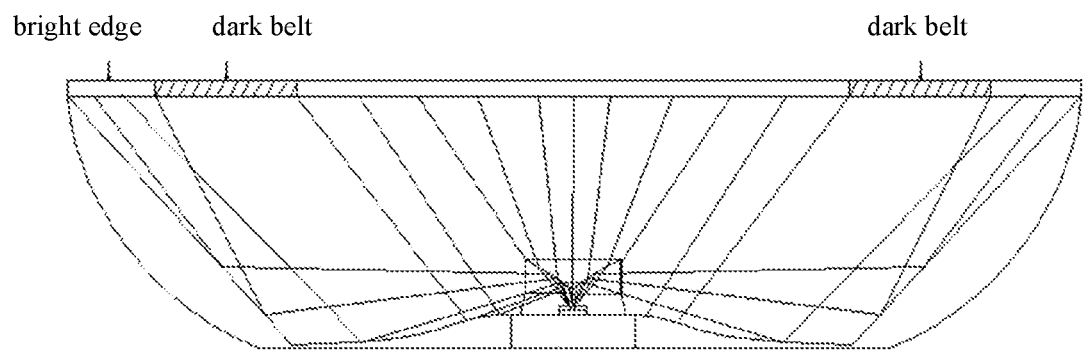
FIG. 1 is a schematic diagram of a light emission principle of a liquid crystal display device in the prior art of the present disclosure.

With the development of display technology, a liquid crystal display has become the most common display device. A liquid crystal itself does not emit light, and it displays graphics or characters as a result of its modulation of light. The liquid crystal display includes a backlight module, where the backlight module is a light source located behind the liquid crystal, and the luminous effect thereof will directly affect the visual effect of a liquid crystal display module. As shown in FIG. 1, the reflective sheet is used in the backlight module, the reflective sheet is generally rectangular, and the edges and corners of the reflective sheet are folded, so that the edges and corners of the reflective sheet form an inclined plane with a certain slope, or form an arc surface with a certain curvature, the edges and corners of the reflective sheet can more effectively reflect light emitted from a point light source; however, since the corners of the reflective sheet are located at the intersection of two edges, the slope (or curvature) of the corners of the reflective sheet is often lower than the slope (or curvature) of the edges of the reflective sheet, so that the corners reflect less light, resulting in a problem that a dark belt or a bright edge appear when a liquid crystal display works, thereby affecting the display effect.

In order to solve the problem that less light is reflected at the corners of the reflective sheet, resulting that the dark belt or the bright edge appears when the liquid crystal display works, a method of perforating the side of the reflective sheet is commonly used in the prior art, so as to eliminate the problem of relatively bright surrounding a lamp and cause that the brightness of the display looks more uniform. However, because a hole size is limited, the extinction effect of the hole is not ideal, which cannot effectively solve the problem of the bright edge and the dark belt around the picture. According to the present disclosure, the partition structures are arranged on a side surface of the reflective sheet, which bends the side surface of the reflective sheet, so that the light can be effectively diffused, which solves the problem that a dark belt or a bright edge appears due to no light reflected by corner positions of the reflective sheet. The detailed descriptions of embodiments are as follows.

Figure 2:
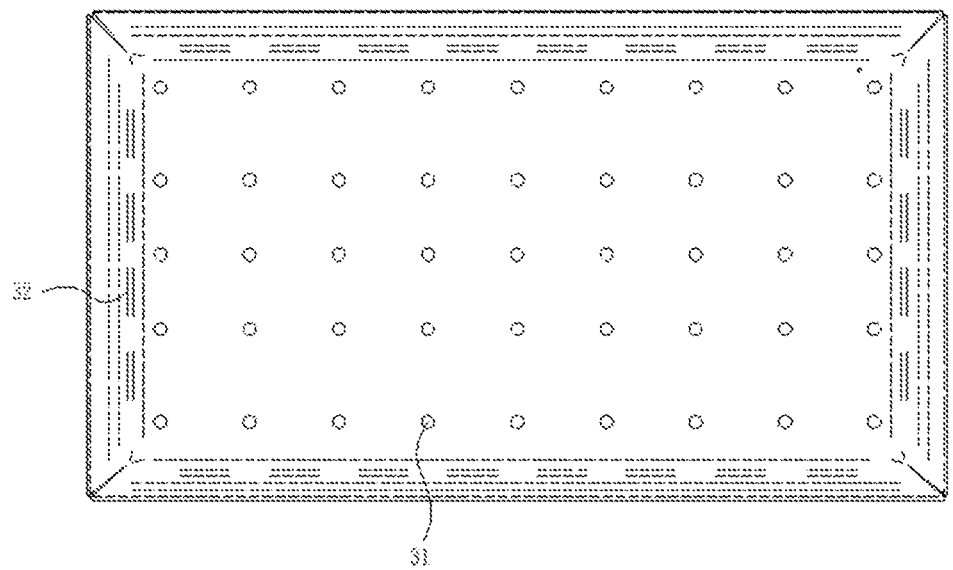
FIG. 2 is a schematic structural diagram of a reflective sheet provided in an embodiment of the present disclosure.
Figure 3:
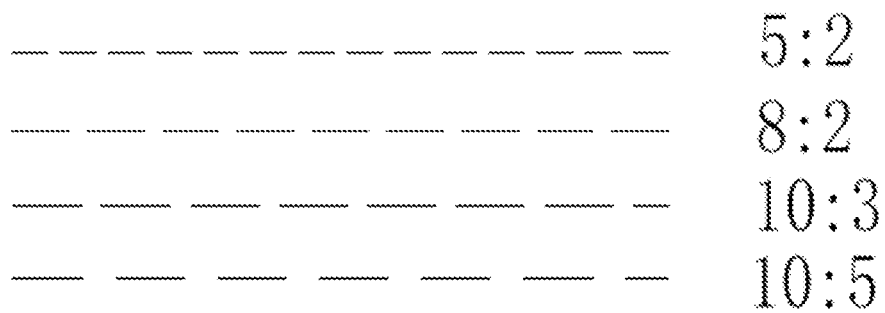
FIG. 3 is a schematic structural diagram of a configuration of a partition line to non-partition line provided in an embodiment of the present disclosure.

FIG. 2 is a schematic structural diagram of a reflective sheet provided in an embodiment of the present disclosure; FIG. 3 is a schematic structural diagram of a configuration of a partition line to non-partition line provided in an embodiment of the present disclosure;

One embodiment of the present disclosure provides the reflective sheet, as shown in FIG. 2, the side surface of the reflective sheet is provided with a partition structure 32, where the partition structures 32 bend the side surface of the reflective sheet at a preset slope; the partition structures 32 include a plurality of dotted lines arranged horizontally or vertically in parallel; and the reflective sheet at the dotted line position is cut, and the solid line portion between two adjacent dotted lines is not cut. Since the reflective sheet at the dotted line position is cut and a plurality of dotted lines are arranged horizontally or vertically in parallel, so that the reflective sheet can be bent at a preset angle when being bent and the side surface of the reflective sheet can have a preset slope. In this method, the partition structures 32 are arranged on the side surface of the reflective sheet, which bends the side surface of the reflective sheet, so that light can be uniformly irradiated on the side surface of the reflective sheet, the phenomena that the side surface of the reflective sheet where the light cannot be irradiated or only less light can be irradiated can be prevented, and the light can be effectively diffused, which solves the problem that a dark belt or a bright edge appear during display due to less light reflected by a side corner region of the reflective sheet and improves display effect.

Optionally, the dotted-to-solid ratios of the dotted lines are greater than or equal to 1, as shown in FIG. 3, and dotted-to-solid ratios of the dotted lines include: 5:2, 8:2, 10:3, 12:5, etc., and the dotted-to-solid ratios of the dotted lines are set equals to or greater than 1, which can ensure that the reflective sheet is not easily broken when bending. In addition, the dotted-to-solid ratios of the dotted lines can be set according to actual requirements, and the present disclosure does not limit the dotted-to-solid ratios of the dotted lines.

Figure 4:
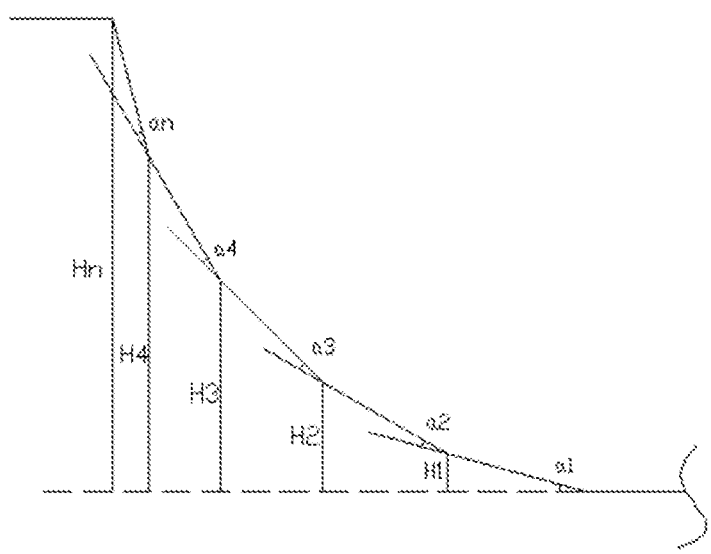
FIG. 4 is a schematic structural diagram of a slope of a side surface of a reflective sheet provided in an embodiment of the present disclosure.

FIG. 4 is a schematic structural diagram of a slope of a side surface of a reflective sheet provided in an embodiment of the present disclosure;

In one embodiment of the present disclosure, as shown in FIG. 4, the slope of the side surface of the reflective sheet plate gradually increases from the bottom, so that the angle of diffusion of light when approaching the top edge of the reflective sheet increases, furthermore, the light can be more uniformly mixed in a light-mixing cavity, and thus the light can be more uniformly irradiated on a diffusion plate, and the problem of a dark belt and a bright edge when displaying is better solved. Optionally, the slope of the side surface of the reflective sheet can be set according to the actual requirements, and the slope of the side surface of the reflective sheet is not limited in the present disclosure.

In one embodiment of the present disclosure, the reflective sheet satisfies the following formula:

$$\Sigma_1^n \alpha i < 90°, \ 5° \leq \alpha i \leq 45° \quad (1)$$

$$5 \text{ mm} < H1 < H2 < \ldots < Hn \quad (2)$$

where, as shown in FIG. 4, $\alpha_i$ is an included angle between adjacent folding angles of a side surface of the reflective sheet, where i=1, 2, . . . , n; $H_1, H_2, \ldots, H_n$ are the vertical heights between each partition structure 32 and the bottom of the reflective sheet, respectively; n is the number of partition structures 32. In addition, the included angle between adjacent folds of the reflective sheet side surface and the vertical height between the partition structures 32 and the bottom of the reflective sheet can be set according to practical situations, and the present disclosure does not limit the included angle between the adjacent folds of the reflective sheet side surface and the vertical height between the partition structures 32 and the bottom of the reflective sheet.

In one embodiment of the present disclosure, a lamp hole 31 is provided at the bottom of the reflective sheet, and can accommodate lamp beads, and the lamp beads emit light into the light-mixing cavity through the lamp hole 31. The light of the lamp beads is allowed to completely irradiate through the lamp hole 31. Optionally, the shape of the lamp hole 31 can be at least one of circular and rectangular according to different lamp bead lenses, or the shape of the lamp hole 31 can also be other shapes according to the actual requirements, and the shape of the lamp hole 31 is not limited in the present disclosure.

In one embodiment of the present disclosure, a method for manufacturing the reflective sheet include: the partition structures 32 are manufactured on the side surface of the reflective sheet; the partition structures 32 bend the side surface of the reflective sheet at a preset slope, where the partition structures 32 include a plurality of dotted lines arranged horizontally or vertically in parallel. The reflective sheet can be self-made by the manufacturer or purchased from an outside source, and the specific source of the reflective sheet is not limited in the present disclosure, where manufacturing the partition structures 32 on the side surface of the reflective sheet includes manufacturing the partition structures 32 by cutting on the side surface of the reflective sheet using a knife-die integral forming process. It is very convenient to cut and manufacturer the partition structures 32 by the knife-die integral forming process, which has the effect of improving the production efficiency.

The slope of the side surface of the reflective sheet gradually increases from the bottom, so that the angle of diffusion of light when approaching the top edge of the reflective sheet increases, furthermore, the light can be more uniformly mixed in a light-mixing cavity, and thus the light can be more uniformly irradiated on a diffusion plate, and the problem of a dark belt and a bright edge when displaying is better solved. Optionally, the slope of the side surface of the reflective sheet can be set according to the actual requirements, and the slope of the side surface of the reflective sheet is not limited in the present disclosure.

The embodiment of the present disclosure provides the reflective sheet and the manufacturing method thereof, the reflective sheet includes a partition structure arranged on a side surface of the reflective sheet, the partition structure bends the side surface of the reflective sheet at a preset slope, and the partition structure includes the plurality of dotted lines arranged horizontally or vertically in parallel. According to the present disclosure, the partition structure is arranged on the side surface of the reflective sheet, which bends the side surface of the reflective sheet, so that light can be uniformly irradiated on the side surface of the reflective sheet, the phenomena that the side surface of the reflective sheet where the light cannot be irradiated or only less light can be irradiated can be prevented, and the light can be effectively diffused, which solves the problem that a dark belt or a bright edge appear during display due to less light reflected by a side corner region of the reflective sheet and improves display effect.

The embodiments of the present disclosure provide a backlight module.

Figure 5:
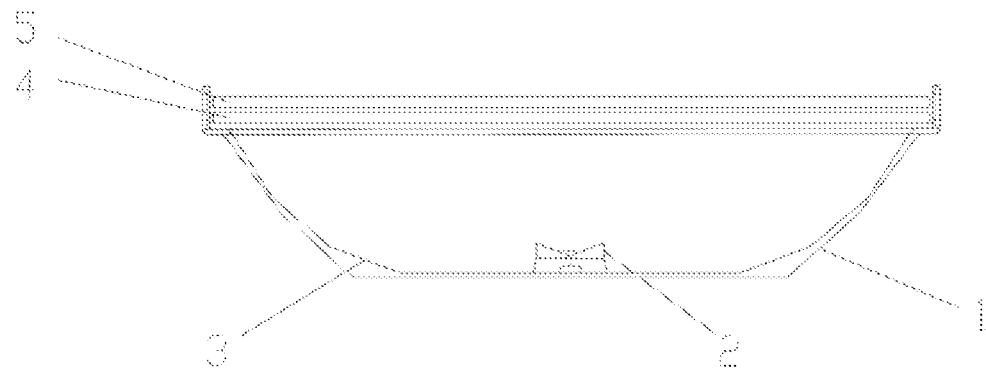
FIG. 5 is a schematic structural diagram of a backlight module provided in an embodiment of the present disclosure.

In one embodiment of the present disclosure, as shown in FIG. 5, the backlight module includes a backplate 1, the reflective sheet 3, a light-emitting element 2, a diffusion plate 4, and a functional film 5 descried in the above embodiments, which are arranged in a stack in order, where the reflective sheet 3 is arranged on one side of the backplate 1 close to the light-emitting element 2, and the reflective sheet 3 constitutes a bottom surface and a side surface of the light-mixing cavity of the backlight module, where a lamp hole 31 is provided at the bottom of the reflective sheet 3, the light-emitting element includes an LED lamp strip, and the lamp beads of the LED lamp strip are arranged in the lamp hole 31. The lamp beads emit light into the light-mixing chamber through the lamp hole 31. The light of the lamp beads is allowed to completely irradiate through the lamp hole 31. Optionally, the shape of the lamp hole 31 can be at least one of circular and rectangular according to different lamp bead lenses, or the shape of the lamp hole 31 can also be other shapes according to the actual requirements, and the shape of the lamp hole 31 is not limited in the present disclosure.

Optionally, the functional film 5 includes at least one of a light intensifying film, a diffusion film, a quantum dot film, and a blue light preventing film; in addition, the type of the functional film 5 is selected according to practical situations, and the present disclosure does not limit the specific type of the functional film 5.

Optionally, the light transmittance of the diffusion plate 4 is between 30% and 70%, and in addition, the light transmittance of the diffusion plate 4 is selected according to the practical situations, and the present disclosure does not limit the light transmittance of the diffusion plate 4.

According to the backlight module provided by the embodiment of the present disclosure, the reflective sheet includes a partition structure arranged on a side surface of the reflective sheet, the partition structure bends the side surface of the reflective sheet at a preset slope, and the partition structure includes the plurality of dotted lines arranged horizontally or vertically in parallel. According to the present disclosure, the partition structure is arranged on the side surface of the reflective sheet, which bends the side surface of the reflective sheet, so that light can be uniformly irradiated on the side surface of the reflective sheet, the phenomena that the side surface of the reflective sheet where the light cannot be irradiated or only less light can be irradiated can be prevented, and the light can be effectively diffused, which solves the problem that a dark belt or a bright edge appear during display due to less light reflected by a side corner region of the reflective sheet and improves display effect.

Figure 6:
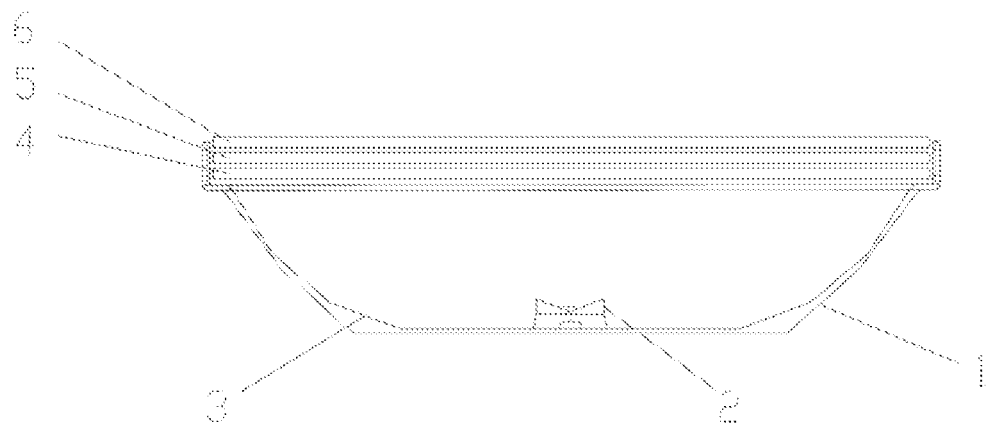
FIG. 6 is a schematic structural diagram of a liquid crystal display device provided in an embodiment of the present disclosure.

FIG. 6 is a schematic structural diagram of a liquid crystal display device provided in an embodiment of the present disclosure.

In one embodiment of the present disclosure, as shown in FIG. 6, the liquid crystal display device includes the backlight module and a liquid crystal panel 6 described in the above-mentioned embodiment, where the liquid crystal panel 6 is arranged on the light-emitting surface side of the backlight module.

Optionally, the liquid crystal display device can be used to an electronic device such as a television or a computer, and the specific use of the liquid crystal display device is optional, and the present disclosure does not limit the specific use of the liquid crystal display device.

According to the liquid crystal display device provided by the embodiment of the present disclosure, the reflective sheet includes a partition structure arranged on a side surface of the reflective sheet, the partition structure bends the side surface of the reflective sheet at a preset slope, and the partition structure includes the plurality of dotted lines arranged horizontally or vertically in parallel. According to the present disclosure, the partition structure is arranged on the side surface of the reflective sheet, which bends the side surface of the reflective sheet, so that light can be uniformly irradiated on the side surface of the reflective sheet, the phenomena that the side surface of the reflective sheet where the light cannot be irradiated or only less light can be irradiated can be prevented, and the light can be effectively diffused, which solves the problem that a dark belt or a bright edge appear during display due to less light reflected by a side corner region of the reflective sheet and improves display effect.

Although the general principles of the present application have been described above in connection with specific embodiments, it should be noted that the advantages, superiorities, effects, etc. mentioned in the present application are merely examples and are not to be considered as limitation, and these advantages, superiorities, effects, etc. must be requirements of the various embodiments of the present application. Furthermore, the specific details disclosed above are only for example purposes and explanation purpose and are not intended to limit, the application may be practiced with the particular details disclosed above.

The block diagrams of devices, apparatus, equipment, and systems referred to in this application are merely illustrative examples and are not intended to require or imply that the connections, arrangements, configurations must be made in the manner shown in the block diagrams. The devices, apparatus, equipment, and systems may be connected, arranged, and configured in any manner, as will be appreciated by those skilled in the art.

It is also noted that each component or step can be disassembled and/or recombined in the apparatus, equipment, and methods of the present application. Such disassembly and/or recombinations should be considered as equivalents to the present application.

The above descriptions about the disclosed aspects are provided to enable any skilled in the art to implement or use the application. Various modifications to these aspects will be readily apparent to those skilled in the art, and the generic principles defined herein can be applied to other aspects without departing from the scope of the application. Thus, the present application is not intended to be limited to the aspects shown herein but is to be accorded the widest scope consistent with the principles and novel features disclosed herein.

In the descriptions of the application, "multiple" means at least two, for example, two and three, unless otherwise limited definitely and specifically. All directional indications (such as up, down, left, right, front, rear, top, bottom) in the embodiments of the present application are only used to explain the relative positional relationship, motion, etc. Between the components at a particular attitude (as shown in the drawings), and if the particular attitude changes, the directional indication changes accordingly. In addition, terms "include" and "have" and any transformations thereof are intended to cover nonexclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

Further, reference herein to "embodiment" means that a particular feature, structure, or characteristic described in connection with the embodiment can be included in at least one embodiment of the present application. Each position where this phrase appears in the specification does not always refer to the same embodiment as well as an independent or alternative embodiment mutually exclusive to another embodiment. It is to be expressly and implicitly understood by one of ordinary skill in the art that the embodiments described herein can be combined with other embodiments.

The above embodiments are merely specific implementation modes of the present disclosure, but the scope of protection of the present disclosure is not limited thereto, and any modification and substitution be apparent to those skilled in the art without departing from the technical scope of the present disclosure shall covered by the scope protection of the present disclosure. Therefore, the scope of protection of the disclosure shall be subject to the scope of protection of the claims. The content described above is just the preferred embodiments of the present disclosure, any modifications, equivalent replacements the like made within the spirit and principle of the disclosure shall fall within the scope of protection of the disclosure.

The content described above is just the preferred embodiments of the present disclosure, any modifications, equivalent replacements the like made within the spirit and principle of the disclosure shall fall within the scope of protection of the disclosure.

What is claimed is:

1. A reflective sheet, comprising partition structures arranged on at least two side surfaces of the reflective sheet, wherein the partition structures bend the at least two side surfaces of the reflective sheet at a preset slope;

the partition structures comprise a plurality of dotted lines arranged horizontally and vertically in parallel;

the reflective sheet at a dotted line position of the dotted line is cut, and a solid line portion of the dotted line between two adjacent dotted line positions is not cut; and the number of the partition structures is greater than or equal to 5 on each of the at least two side surfaces.

2. The reflective sheet according to claim 1, wherein the dotted-to-solid ratios of the dotted lines are greater than or equal to 1.

3. The reflective sheet according to claim 1, wherein the slope of the side surfaces of the reflective sheet gradually increases from the bottom.

4. The reflective sheet according to claim 1, wherein the reflective sheet satisfies the following formula:

$$\Sigma_1^n \alpha i < 90°, 5° \leq \alpha i \leq 45°;$$

$$5 \text{ mm} < H1 < H2 < \ldots < Hn;$$

wherein αi is an included angle between adjacent folding angles of a side surface of the reflective sheet, wherein i=1, 2, ..., n; H1, H2, ..., Hn are the vertical heights between each partition structure and the bottom of the reflective sheet, respectively; n is the number of partition structures.

5. The reflective sheet according to claim 1, wherein a lamp hole is formed at the bottom of the reflective sheet.

6. A method for manufacturing a reflective sheet, comprising: manufacturing partition structures on at least two side surfaces of the reflective sheet, wherein the partition structures bend the at least two side surfaces of the reflective sheet at a preset slope;

the partition structures comprise a plurality of dotted lines arranged horizontally and vertically in parallel;

the reflective sheet at a dotted line position of the dotted line is cut, and a solid line portion of the dotted line between two adjacent dotted line positions is not cut; and the number of the partition structures is greater than or equal to 5 on each of the at least two side surfaces.

7. The method for manufacturing the reflective sheet according to claim 6, wherein the slope of the side surface of the reflective sheet gradually increases from the bottom.

8. The method for manufacturing the reflective sheet according to claim 6, wherein the dotted-to-solid ratios of the dotted lines are 1 or more.

9. The method for manufacturing the reflective sheet according to claim 6, wherein the reflective sheet satisfies the following formula:

$$\Sigma_1^n \alpha i < 90°, 5° \leq \alpha i \leq 45°;$$

$$5 \text{ mm} < H1 < H2 < \ldots < Hn;$$

wherein αi is an included angle between adjacent folding edges of a side surface of the reflective sheet, wherein i=1, 2, ..., n; H1, H2, ..., Hn are the vertical heights between each partition structure and the bottom of the reflective sheet, respectively; n is the number of partition structures.

10. The method for manufacturing a reflective sheet according to claim 6, wherein a lamp hole is formed at the bottom of the reflective sheet.

11. A backlight module, comprising: a back plate, a reflective sheet, a light-emitting element, a diffusion plate, and a functional film which are arranged in a stack in order, wherein the reflective sheet comprises partition structures provided on at least two side surfaces of the reflective sheet, and the partition structures bend the at least two side surfaces of the reflective sheet at a preset slope, and the partition structures comprise a plurality of dotted lines arranged horizontally and vertically in parallel;

wherein the reflective sheet constitutes a bottom surface and a side surface of a light mixing cavity of the backlight module;

the reflective sheet at a dotted line position of the dotted line is cut, and a solid line portion of the dotted line between two adjacent dotted line positions is not cut; and the number of the partition structures is greater than or equal to 5 on each of the at least two side surfaces.

12. The backlight module according to claim 11, wherein the bottom of the reflective sheet is provided with a lamp hole, and the light-emitting element comprises an LED lamp strip, wherein lamp beads of the LED lamp strip are arranged in the lamp hole.

13. The backlight module according to claim 11, wherein a functional film comprises at least one of a light intensifying film, a diffusion film, a quantum dot film, and a blue light preventing film.

14. The backlight module according to claim 11, wherein the light transmittance of the diffusion plate is 30-70%.

15. The backlight module according to claim 11, wherein the dotted-to-solid ratios of the dotted line are greater than or equal to 1.

16. The backlight module according to claim 11, wherein the slope of the reflective sheet side surface gradually increases from the bottom.

17. The backlight module according to claim 11, wherein the reflective sheet satisfies the following formula:

$$\Sigma_1^n \alpha i < 90°, 5° \leq \alpha i \leq 45°;$$

$$5 \text{ mm} < H1 < H2 < \ldots < Hn;$$

wherein αi is an included angle between adjacent folding angles of a side surface of the reflective sheet, wherein i=1, 2, ..., n; H1, H2, ..., Hn are the vertical heights between each partition structure and the bottom of the reflective sheet, respectively; n is the number of partition structures.

18. The backlight module according to claim 11, wherein a lamp hole is formed at the bottom of the reflective sheet.

19. A liquid crystal display device, comprising the backlight module as claimed in claim 11 and a liquid crystal panel arranged on the light-emitting surface side of the backlight module.

* * * * *